United States Patent
Fujie (10) Patent No.: US 7,638,747 B2
(45) Date of Patent: Dec. 29, 2009

(54) VEHICULAR AUTO LIGHT SYSTEM

(75) Inventor: Kenichi Fujie, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 464 days.

(21) Appl. No.: 11/790,153

(22) Filed: Apr. 24, 2007

(65) Prior Publication Data
US 2008/0100225 A1 May 1, 2008

(30) Foreign Application Priority Data
Oct. 31, 2006 (JP) ............................. 2006-295973

(51) Int. Cl.
*B60Q 1/04* (2006.01)
*H01L 27/00* (2006.01)
(52) U.S. Cl. .............. 250/208.1; 250/205; 250/214 AL
(58) Field of Classification Search .............. 250/208.1, 250/205, 214 AL; 348/148
See application file for complete search history.

(56) References Cited

U.S. PATENT DOCUMENTS

| | | | |
|---|---|---|---|
| 6,291,906 B1 * | 9/2001 | Marcus et al. ............. 307/10.1 |
| 6,426,492 B1 * | 7/2002 | Bos et al. ................. 250/208.1 |
| 6,667,471 B2 * | 12/2003 | Bos et al. ................. 250/208.1 |
| 2002/0185587 A1 * | 12/2002 | Bos et al. ................. 250/208.1 |
| 2006/0028560 A1 * | 2/2006 | Konda et al. ................. 348/234 |
| 2006/0187314 A1 * | 8/2006 | Fujie et al. ............... 348/222.1 |
| 2007/0177815 A1 * | 8/2007 | Yang et al. .................. 382/254 |
| 2008/0100225 A1 * | 5/2008 | Fujie .......................... 315/156 |
| 2009/0092284 A1 * | 4/2009 | Breed et al. ................. 382/103 |

FOREIGN PATENT DOCUMENTS

JP 11-321440 A 11/1999

* cited by examiner

*Primary Examiner*—John R Lee
(74) *Attorney, Agent, or Firm*—Sughrue Mion, PLLC (57) ABSTRACT

A vehicular auto light system is configured to calculate screen brightness on the basis of image data obtained from imaging means that images the outside of a vehicle, operate the imaging means and control imaging conditions with imaging condition control means such that the screen brightness becomes constant, estimate the amount of light around the vehicle with around-vehicle light amount estimating means on the basis of an operation amount of the imaging conditions, and turn lights of the vehicle ON or OFF on the basis of the light amount estimation result.

4 Claims, 10 Drawing Sheets

Wi:WEIGHTING(i=1~3)

FIG. 4

Wi:WEIGHTING(i=1~2)

VEHICULAR AUTO LIGHT SYSTEM

BACKGROUND OF THE INVENTION

1. Field of the Invention

The present invention relates to a vehicular auto light system configured to turn ON or turn OFF the headlights of a vehicle on the basis of image data imaged by imaging means.

2. Description of Related Art

Vehicular auto light systems configured to directly detect the amount of light above a vehicle with a light-receiving element disposed on the dashboard of the vehicle and turn ON or turn OFF the lights on the basis of the detected light amount are already being marketed. Further, vehicular headlight devices configured to automatically turn ON the headlights when the device judges that it is nighttime on the basis of image data obtained from imaging means and a detection signal of a sensor for detecting outside light have already been proposed (e.g., see JP-A-11-321440.)

However, because the device disclosed in JP-A-11-321440 is configured to turn ON the headlights on the basis of a screen brightness of image data obtained by the imaging means, there has been the problem that the device cannot be concomitantly used for purposes where it is necessary to control the screen brightness constant regardless of the amount of peripheral light, such as a device that uses a road surface marking recognition function to process image data from imaging means and recognize road surface markings on roadways or a device that uses an obstacle detection function to process image data from imaging means and detect obstacles, and the imaging means is dedicated to judging the amount of light outside the vehicle, which is uneconomical.

SUMMARY OF THE INVENTION

The invention has been made in view of this problem in conventional devices, and it is an object thereof to obtain an auto light system that realizes an auto light function using imaging means and can also utilize the imaging means for image processing functions other than the auto light function.

A vehicular auto light system according to the invention includes: imaging means that is installed in a vehicle, images at least the area in front of the vehicle, and outputs image data thereof; screen brightness calculating means that calculates a screen brightness on the basis of the image data; imaging condition control means that compares the calculated screen brightness with a target value, operates the imaging means by an operation amount based on the deviation between the calculated screen brightness and the target value, and controls imaging conditions of the imaging means; around-vehicle light amount estimating means that estimates the amount of light around the vehicle on the basis of the operation amount; and headlight control means that causes headlights of the vehicle to be turned ON or OFF on the basis of the estimated amount of light.

According to the vehicular auto light system according to the invention, the vehicular auto light system includes: imaging means that is installed in a vehicle, images at least the area in front of the vehicle, and outputs image data thereof; screen brightness calculating means that calculates a screen brightness on the basis of the image data; imaging condition control means that compares the calculated screen brightness with a target value, operates the imaging means by an operation amount based on the deviation between the calculated screen brightness and the target value, and controls imaging conditions of the imaging means; around-vehicle light amount estimating means that estimates the amount of light around the vehicle on the basis of the operation amount; and headlight control means that causes headlights of the vehicle to be turned ON or OFF on the basis of the estimated amount of light. Therefore, the vehicular auto light system can control, at a constant, the screen brightness obtained from the screen brightness calculating means while simultaneously judging the amount of light around the vehicle on the basis of the operation amount of the imaging conditions, can also utilize the imaging means for image processing functions such as road surface marking recognition and obstacle detection in addition to its function in an auto light system of a vehicle, and can improve cost performance.

The foregoing and other object, features, and advantages of the present invention will become more apparent from the following-detailed description of the present invention when taken in conjunction with the accompanying drawings.

BRIEF DESCRIPTION OF THE DRAWINGS

Exemplary embodiments of the invention will be described in detail below on the basis of the attached drawings, wherein.

DETAILED DESCRIPTION

Embodiment 1

Figure 1:
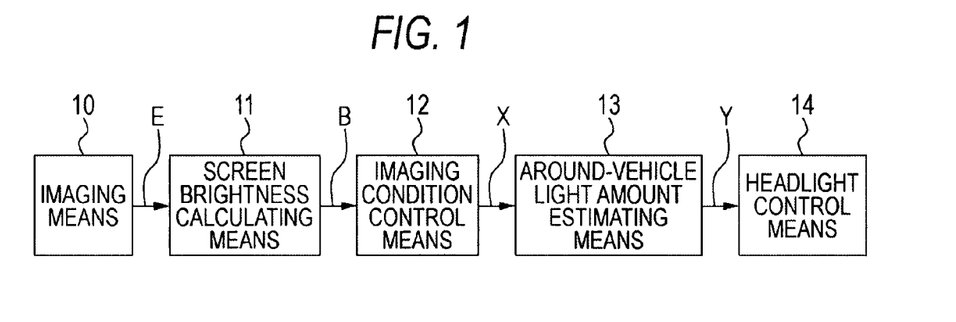
FIG. 1 is a block diagram showing the configuration of an auto light system according to an embodiment 1 of the invention.
Figure 2:
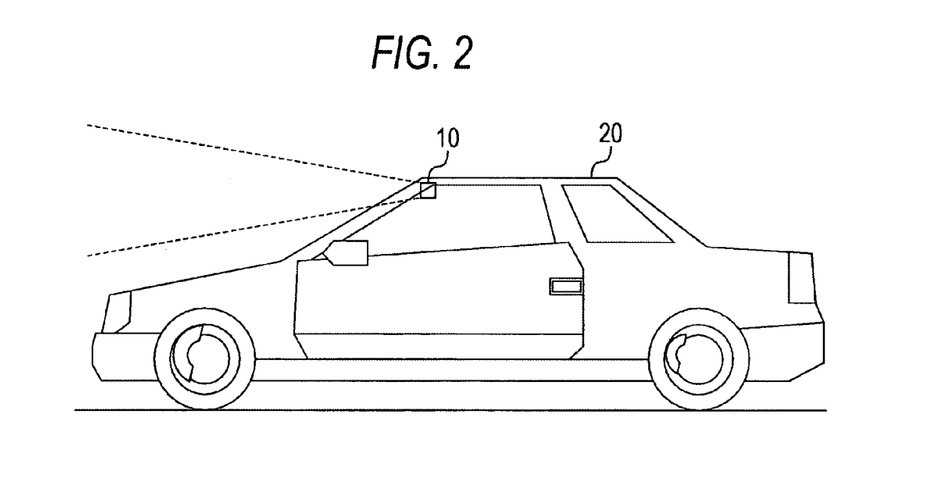
FIG. 2 is an explanatory diagram showing an example of the installation of imaging means in a vehicle.

FIG. 1 is a block diagram showing the configuration of a vehicular auto light system according to an embodiment 1 of the invention. In FIG. 1, imaging means 10 is configured by a CCD camera and the like installed in a vehicle, images an area mainly in front of its own vehicle, and outputs image data E. For example, as shown in FIG. 2, the imaging means 10 may be attached in the vicinity of a rearview mirror of a vehicle 20 and configured to image the area mainly in front of its own vehicle. Screen brightness calculating means 11 calculates and outputs a value of a screen brightness B on the basis of the brightness value of each pixel of the image data E obtained from the imaging means 10.

Imaging condition control means 12 calculates imaging conditions of the imaging means 10 such as exposure time and gain such that the screen brightness B obtained from the screen brightness calculating means 11 becomes constant regardless of an amount of light C around the vehicle, and outputs an operation amount X based on the calculation result. The imaging means 10 is operated on the basis of the operation amount X, and imaging conditions of the imaging means 10 such as exposure time and gain are adjusted. Around-vehicle light amount estimating means 13 estimates the amount of light around the vehicle on the basis of the operation amount X obtained from the imaging condition control means 12, and outputs a light amount estimated value Y. Headlight control means 14 turns headlights of the vehicle ON or OFF on the basis of the around-vehicle light amount estimated value Y obtained from the around-vehicle light amount estimating means 13.

Figure 3:
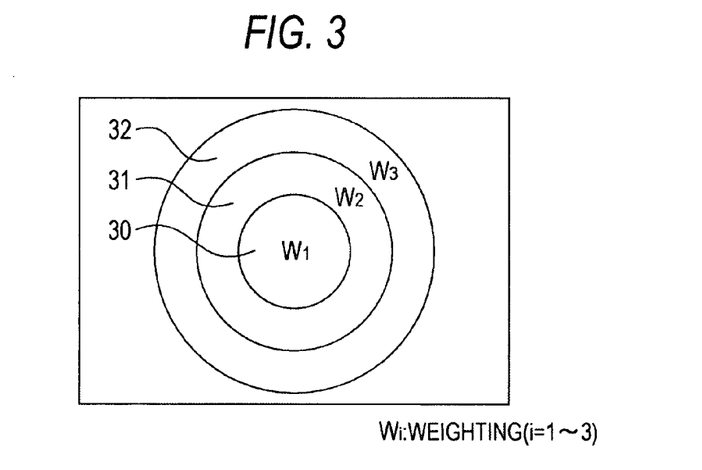
FIG. 3 is an explanatory diagram showing a screen brightness calculating method in the auto light system according to the embodiment 1 of the invention.
Figure 4:
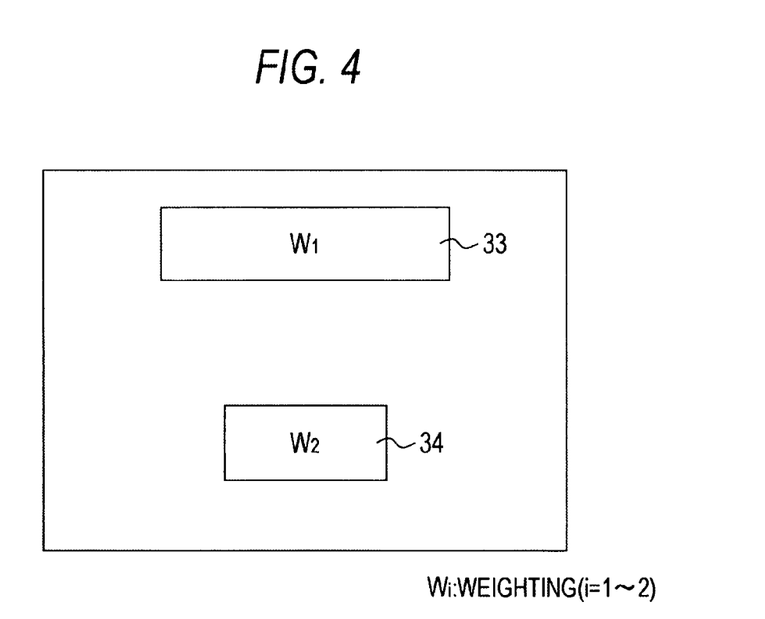
FIG. 4 is an explanatory diagram for describing a screen brightness calculating method.

FIG. 3 and FIG. 4 are explanatory diagrams describing methods of calculating the screen brightness B by the screen brightness calculating means 11. As the method of calculating the screen brightness B by the screen brightness calculating means 11, there is a method that determines the average of the brightness value of each pixel in the image data from the imaging means 10, but when the position of a subject on the screen is known beforehand, then as shown in FIG. 3, a method that sets regions 30, 31, and 32 that calculate one or more brightness averages centered on the place where the subject appears, performs weighting W1, W2, and W3 per region, and determines the weighted average of those to calculate screen brightness, or as shown in FIG. 4, a method that disposes regions 33 and 34 that calculate one or more brightness averages above and below a front image, performs weighting W1 and W2 in those plural regions 33 and 34, and determines the weighted average of those to calculate screen brightness are conceivable. Alternatively, there is also a method that uses the maximum or minimum of the brightness of each pixel rather than the brightness average for the screen brightness.

Figure 5:
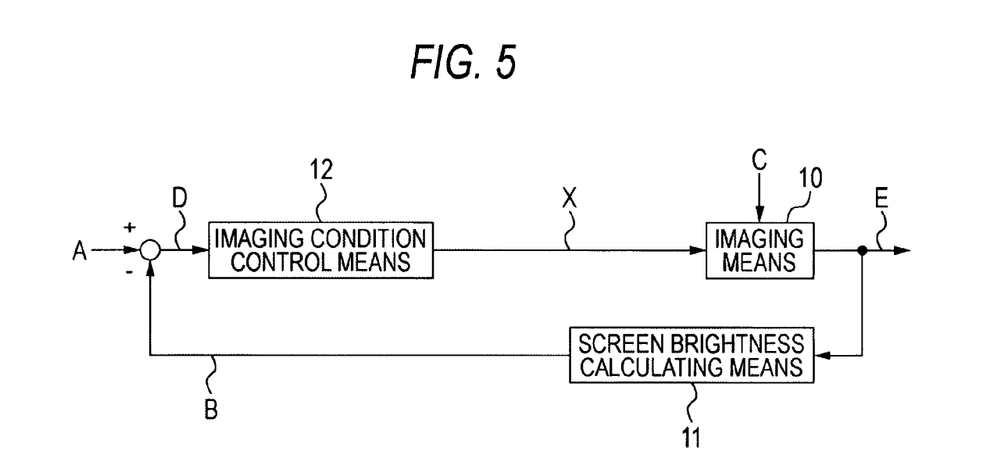
FIG. 5 is an explanatory diagram for describing a screen brightness calculating method.

FIG. 5 is an explanatory diagram showing a control system that makes constant the screen brightness B in the auto light system according to the first exemplary embodiment of the invention. In FIG. 5, the imaging condition control means 12 calculates imaging conditions such as exposure time and gain of the imaging means 10 such that a deviation D based on a comparison of a target value A of screen brightness and the actual screen brightness B obtained from the screen brightness calculating means 11 becomes 0. The imaging means 10 is operated by the operation amount X based on the calculation result of the screen brightness calculating means 11, and exposure time and gain of the imaging means 10 are adjusted. As a result, the screen brightness B obtained from the screen brightness calculating means 11 is controlled to become constant regardless of the amount of light C around the vehicle.

Estimation of the amount of light around the vehicle by the around-vehicle light amount estimating means 13 is performed in the following manner. That is, the relationship between the amount of light C around the vehicle, the operation amount X, and the screen brightness B can be expressed as in the following expression (1) by the control system shown in FIG. 5.

$$B \propto X \cdot C \qquad \text{expression (1)}$$

Here, it will be understood that, because the screen brightness B is controlled to a constant value by the imaging condition control means 12, the amount of light C around the vehicle is proportional to the inverse of the operation amount X. Thus, the proportionality coefficient in expression (1) is determined by measuring beforehand the operation amount X and the amount of light C around the vehicle during daytime and during nighttime so that the amount of light around the vehicle can be relatively estimated from the current operation amount X.

Figure 6:
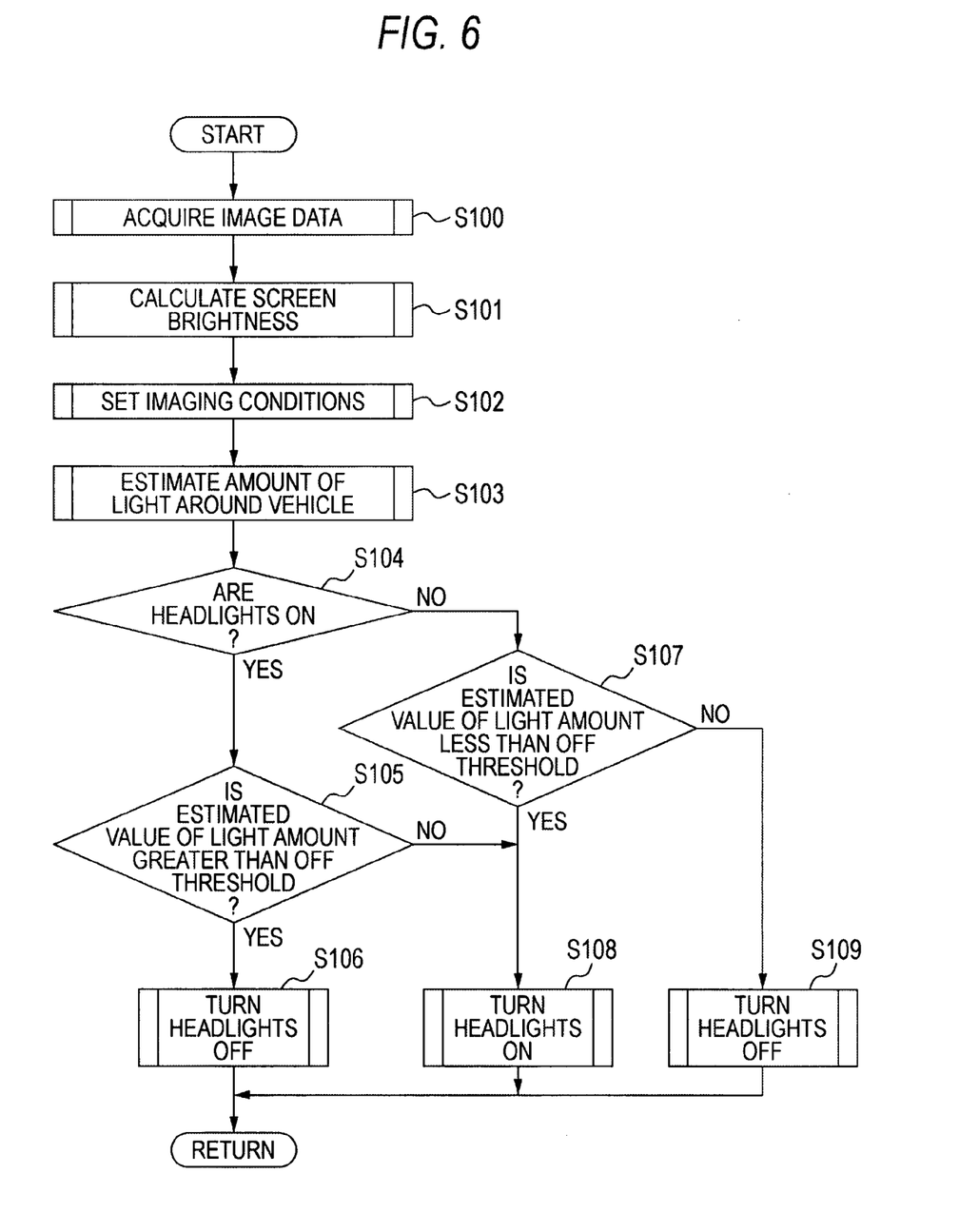
FIG. 6 is a flowchart showing operation of the auto light system according to the embodiment 1 of the invention.

Next, operation of the vehicular auto light system according to the first exemplary embodiment of the invention will be described. FIG. 6 is a flowchart showing that operation. In FIG. 6, first, the brightness value of each pixel is acquired from the image data E of the imaging means 10 by step S100. Next, operation moves to step S101, where the screen brightness B is calculated by any of the aforementioned methods by the screen brightness calculating means 11 on the basis of the brightness value of each pixel. Next, in step S102, the operation amount X is calculated by the imaging condition control means 12 on the basis of the calculated screen brightness B, and then operation moves to step S103.

In step S103, the amount of light around the vehicle is estimated by the around-vehicle light amount estimating means 13 on the basis of the calculated operation amount X to obtain the light amount estimated value Y. For example, as mentioned previously, the inverse of the operation amount X is determined as the light amount estimated value Y by expression (1). In step S104, whether or not the headlights of the vehicle are already ON is determined on the basis of a signal working together with the turning ON and the turning OFF of the headlights. When the headlights are already ON, then operation moves to step S105, and when the headlights are not ON, then operation moves to step S107.

In step S105, the light amount estimated value Y is compared with an OFF threshold F of the headlights in the vehicle headlight control means 14, and when the following expression (2) is satisfied, then it is judged that the area around the vehicle has become bright, operation moves to step S106, and the headlights are turned OFF.

$$Y > F \qquad \text{expression (2)}$$

When expression (2) is not satisfied, then operation moves to step S108 and the headlights are turned ON.

When it is determined in step S104 that the headlights of the vehicle are not ON, then operation moves to step S107. In step S107, the light amount estimated value Y is compared with an ON threshold G of the headlights, and when the following expression (3) is satisfied, then it is judged that the area around the vehicle has become dark, operation moves to step S108, and the headlights are turned ON.

$$Y < G \qquad \text{expression (3)}$$

When expression (3) is not satisfied, then operation moves to step S109 and the headlights are turned OFF.

It will be noted that the aforementioned ON threshold G and OFF threshold F may be adjusted to match the preference of the driver.

As described above, according to the auto light system according to the embodiment 1 of the invention, the auto light system uses the estimated value Y of the amount of light around the vehicle to judge the amount of light around the vehicle and perform control to turn the headlights ON or OFF and control the screen brightness B to a constant, so the auto light system can utilize the imaging means for an auto light system and for image processing such as road surface marking recognition, license plate recognition, or rearview monitoring, and the cost performance of an auto light system can be improved.

Embodiment 2

Figure 7:
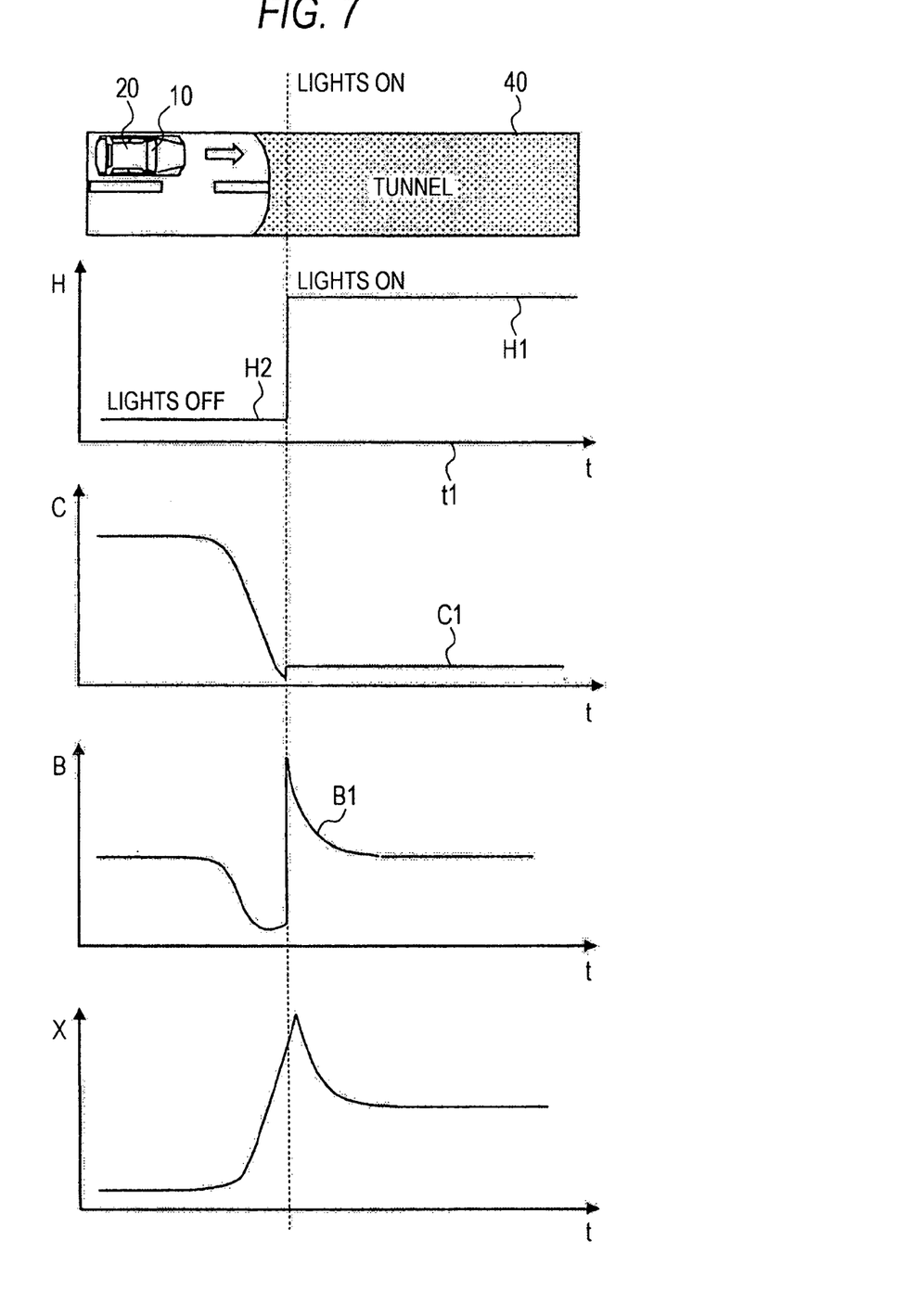
FIG. 7 is an explanatory diagram showing control characteristics of imaging conditions accompanying changes in the amount of light around the vehicle resulting from turning ON headlights at the entrance of a tunnel.

Sometimes, when the headlights of the auto light system are turned ON or OFF, the light of the headlights affects image processing as disturbance and the screen brightness B suddenly changes. For example, as shown in FIG. 7, when, at the entrance of a tunnel 40, the headlights are turned ON at a point in time t1 when the amount of light C in front of the vehicle 20 becomes less than an amount of light H1 when the headlights are ON, then the amount of light C in front of the vehicle 20 suddenly increases by an amount equal to the light of the headlights and becomes C1, and the screen brightness B also suddenly increases and becomes B1.

Figure 8:
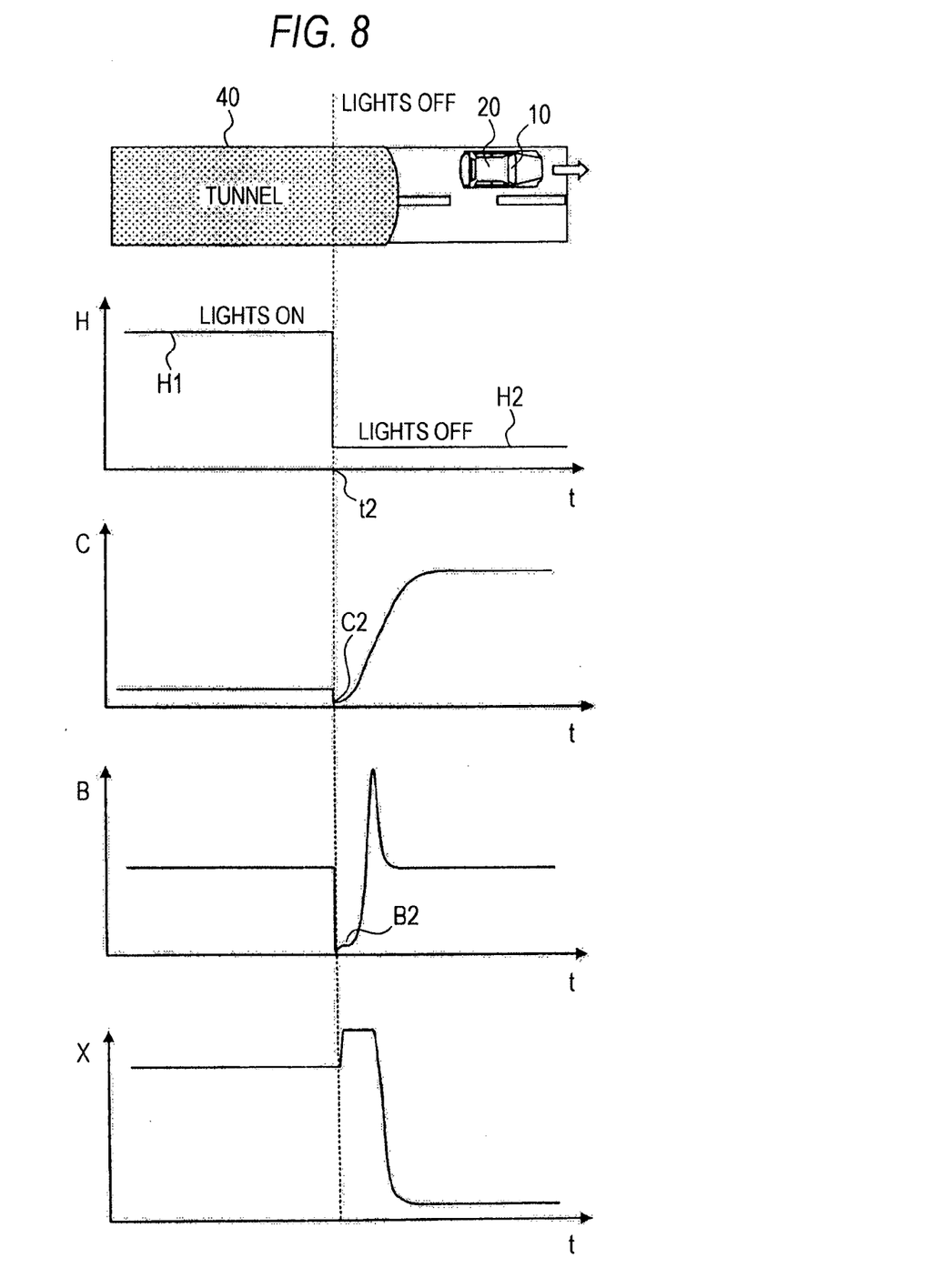
FIG. 8 is an explanatory diagram showing an example of control characteristics of imaging conditions accompanying changes in the amount of light around a vehicle resulting from turning OFF headlights at the exit of a tunnel.

Similarly, as shown in FIG. 8, when, at the exit of the tunnel 40, the headlights are turned OFF at a point in time t2 where the amount of light C in front of the vehicle is about the same as an amount of light H2 when the headlights are OFF, then the amount of light C in front of the vehicle suddenly decreases by an amount equal to the amount of light H1 when the headlights are ON and becomes C2, so the screen brightness B suddenly decreases and becomes B2.

Thus, an auto light system according to an embodiment 2 of the invention is configured to control sudden changes in the screen brightness B resulting from turning the headlights ON or OFF by correcting the operation amount X of the imaging conditions obtained from the imaging condition control means 12 in response to changes in the amount of light C around the vehicle resulting from the headlights being turned ON or OFF. The embodiment 2 will be described in detail below.

Figure 9:
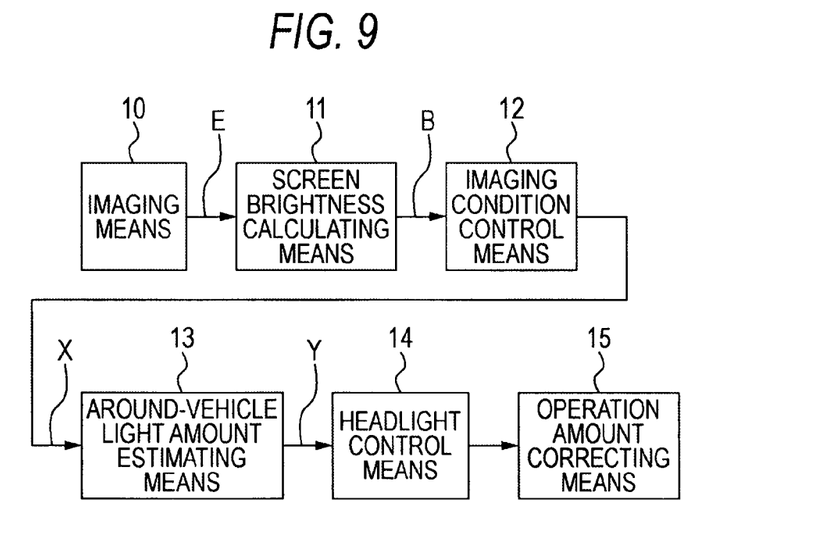
FIG. 9 is a block diagram showing the configuration of an auto light system according to an embodiment 2 of the invention.

FIG. 9 is a block diagram showing the configuration of the vehicular auto light system according to the embodiment 2 of the invention. In FIG. 9, imaging means 10 is configured by a CCD camera and the like installed in a vehicle, images an area mainly in front of its own vehicle, and outputs image data E. For example, as shown in FIG. 2, the imaging means 10 may be attached in the vicinity of a rearview mirror of a vehicle 20 and configured to image the area mainly in front of its own vehicle. Screen brightness calculating means 11 calculates and outputs a value of a screen brightness B on the basis of the brightness value of each pixel of the image data E obtained from the imaging means 10.

Imaging condition control means 12 calculates imaging conditions of the imaging means 10 such as exposure time and gain such that the screen brightness B obtained from the screen brightness calculating means 11 becomes constant regardless of an amount of light C around the vehicle, and outputs an operation amount X based on the calculation result. The imaging means 10 is operated on the basis of the operation amount X, and imaging conditions such as exposure time and gain are adjusted. Around-vehicle light amount estimating means 13 estimates the amount of light around the vehicle on the basis of the operation amount X obtained from the imaging condition control means 12, and outputs a light amount estimated value Y. Headlight control means 14 turns headlights of the vehicle ON or OFF on the basis of the around-vehicle light amount estimated value Y obtained from the around-vehicle light amount estimating means 13. Operation amount correcting means 15 corrects the operation amount X in order to prevent the amount of light C in front of the vehicle from increasing or decreasing and prevent the screen brightness B from suddenly changing due to the headlights being turned ON or turned OFF as described later.

Figure 10:
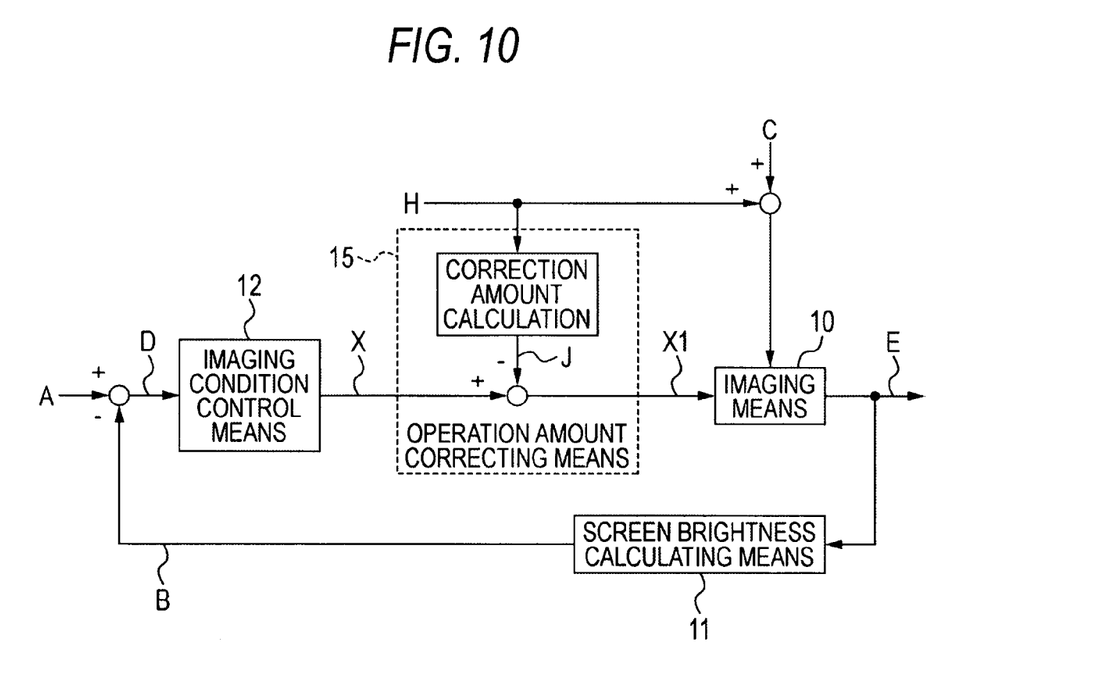
FIG. 10 is an explanatory diagram showing a control system that makes screen brightness constant in the auto light system according to the embodiment 2 of the invention.

FIG. 10 is an explanatory diagram showing a control system that makes constant the screen brightness B in the vehicular auto light system according to the embodiment 2 of the invention. In FIG. 10, the imaging condition control means 12 calculates imaging conditions of the imaging means 10 such as exposure time and gain such that a deviation D based on a comparison of a target value A of screen brightness and the actual screen brightness B obtained from the screen brightness calculating means 11 becomes 0, and outputs the operation amount X on the basis of that calculation. The operation amount correcting means 15 calculates a correction amount J of the operation amount X on the basis of the following expression (4) from the operation amount X from the imaging condition control means 12, the amount of light H of the headlights, and the amount of light C around the vehicle, subtracts the correction amount J from the operation amount X, and outputs a corrected operation amount X1.

$$J = X[H/(C+H)]$$ expression (4)

The imaging means 10 is operated by the operation amount X1 corrected by the operation amount correcting means 15, and the exposure time and gain of the imaging means 10 are adjusted. As a result, the screen brightness B obtained from the screen brightness calculating means 11 is controlled to become substantially constant.

Figure 11:
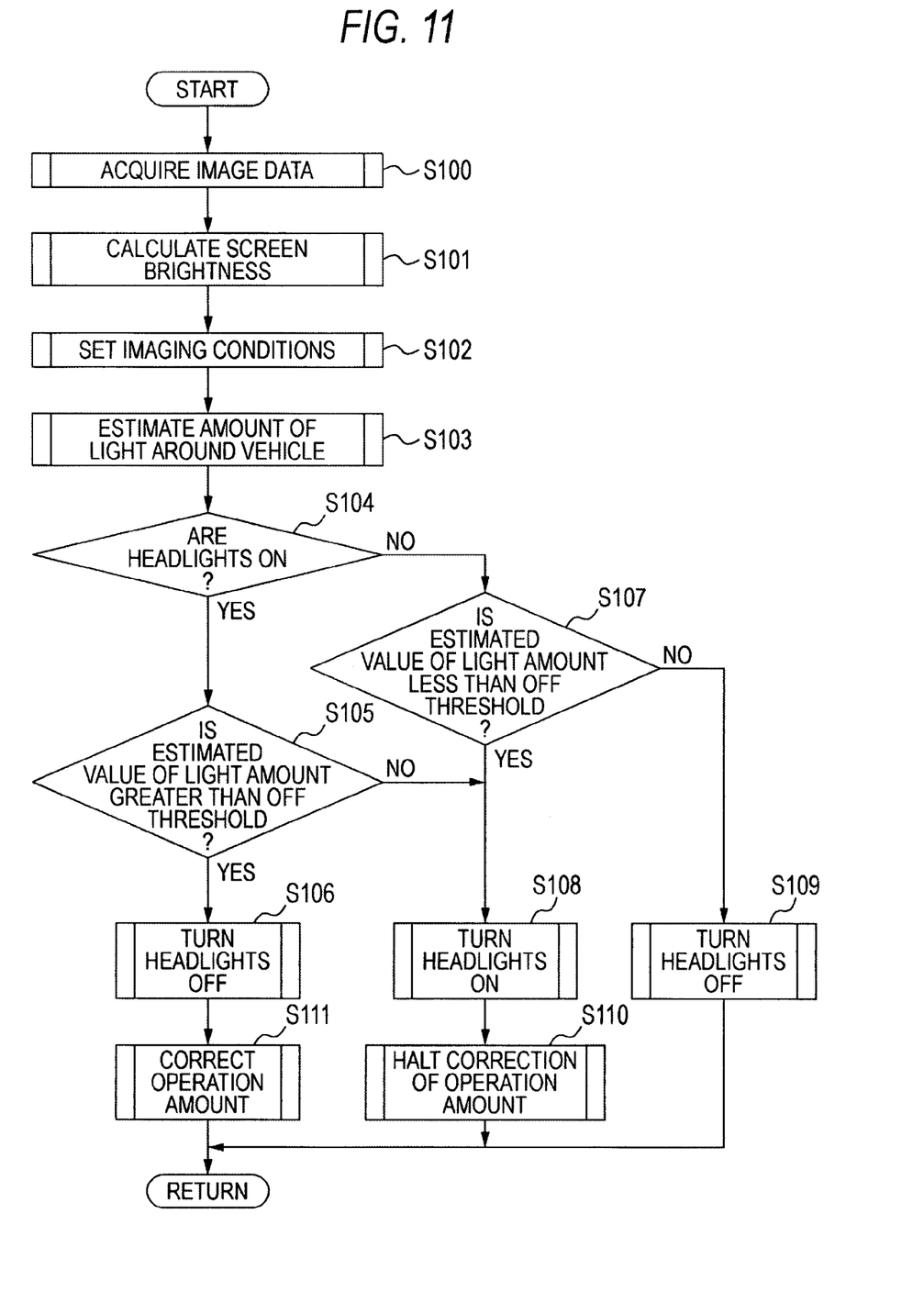
FIG. 11 is a flowchart showing operation of the auto light system according to the embodiment 2 of the invention.

Next, operation of the auto light system according to the embodiment 2 of the invention will be described. FIG. 11 is a flowchart describing operation of the auto light system according to the second exemplary embodiment of the invention. In FIG. 11, the processing from step S100 to step S109 is the same as that of the flowchart of the first exemplary embodiment shown in FIG. 6. It is judged that it is necessary to turn the headlights ON through the processing of step S100 to step S105 or through step S104 to step S107, and in step S108, a headlight ON signal is outputted. In step S110, the correction amount J of the operation amount is determined on the basis of the aforementioned expression (4) by the operation amount correcting means 15 after the headlight ON signal has been outputted, the correction amount J is subtracted from the operation amount X that the imaging condition control means 12 outputs, and imaging conditions of the imaging means 10 are adjusted by the corrected operation amount X1. As a result, an increase in the amount of light resulting from the headlights being turned ON is controlled, and the screen brightness B from the imaging means 10 is controlled to a substantially constant value.

Figure 12:
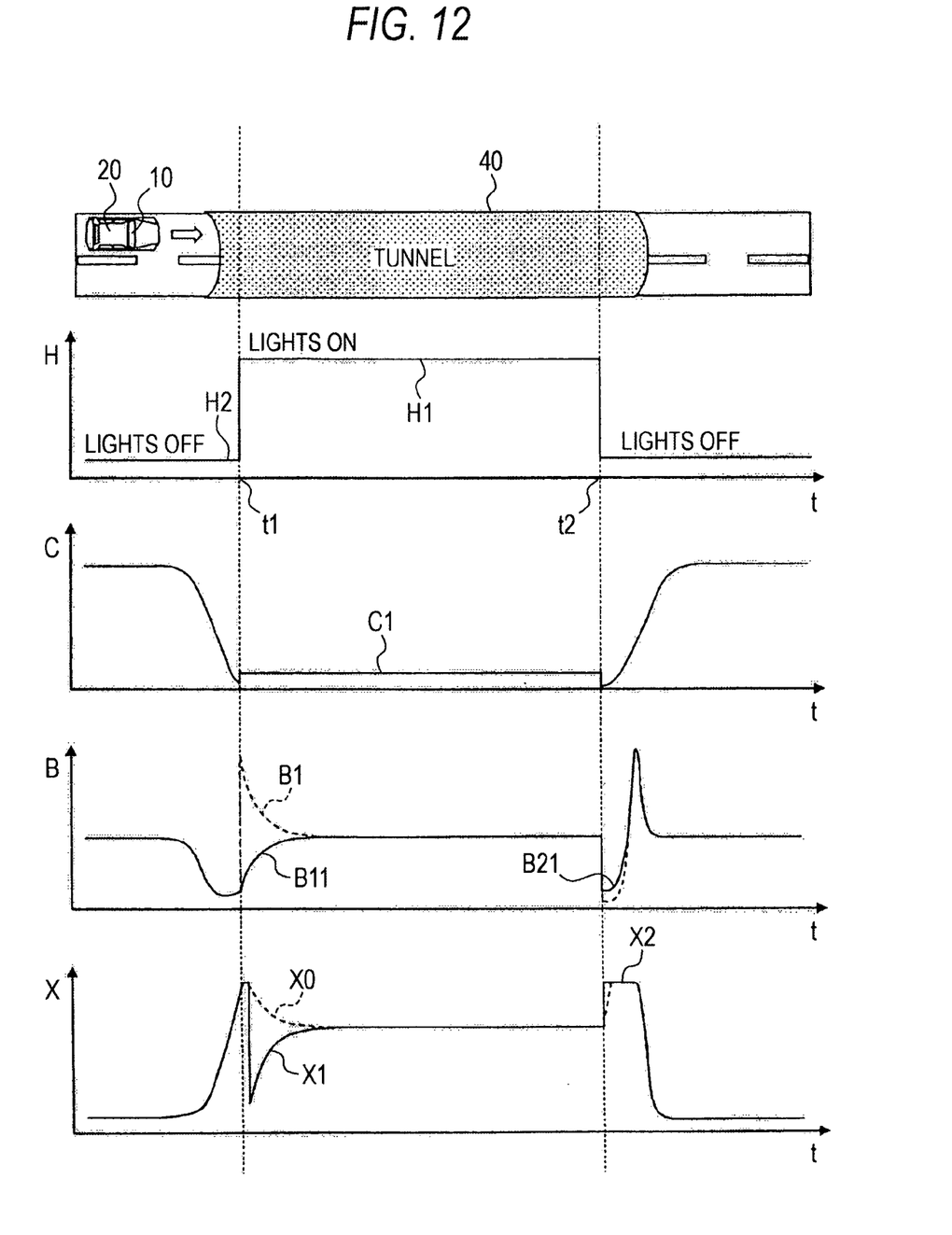
FIG. 12 is an explanatory diagram describing operation of the auto light system according to the embodiment 2 of the invention.

When a headlight OFF signal is outputted in step S106, then correction of the operation amount is halted in step S111. FIG. 12 is an explanatory diagram describing operation of the auto light system according to the embodiment 2 of the invention That is, as shown in FIG. 12, fluctuation of the screen brightness B resulting from the headlights being turned ON can be reduced by applying to the imaging means 10 the correction amount J at the point in time when the headlights are turned ON at the entrance of the tunnel 40. In FIG. 12, B1 represents the screen brightness of an operation amount X0 when correction by the correction amount J is not being performed, and B11 represents the screen brightness when the operation amount X has been changed to the corrected operation amount X1 by the correction amount J. At the exit of the tunnel 40, correction of the operation amount X is halted at the point in time t2 when the headlights are turned OFF, and the operation amount X becomes X2, so the fluctuation of the screen brightness B resulting from the headlights being turned OFF becomes B21 and can be kept small.

As described above, according to the embodiment 2 of the invention, sudden changes in the screen brightness resulting from the headlights being turned ON or OFF can be controlled, and affects on image processing can be reduced.

Embodiment 3

An auto light system according to an embodiment 3 of the invention is configured to control sudden changes in the screen brightness resulting from the headlights being turned ON or OFF by disposing a limit on the timing when the headlights are turned ON or OFF. The details thereof will be described below.

In the auto light system according to the embodiment 3, a limit resulting from the following expression (5) is disposed for the aforementioned OFF threshold F and a limit resulting from the following expression (6) is disposed for the aforementioned ON threshold G in the vehicle headlight control means 14 according to the embodiment 1 or the embodiment 2. The remaining configuration is the same as that of the embodiment 1 or the embodiment 2.

$$F > H \quad \text{expression (5)}$$

$$G > H \quad \text{expression (6)}$$

Figure 13:
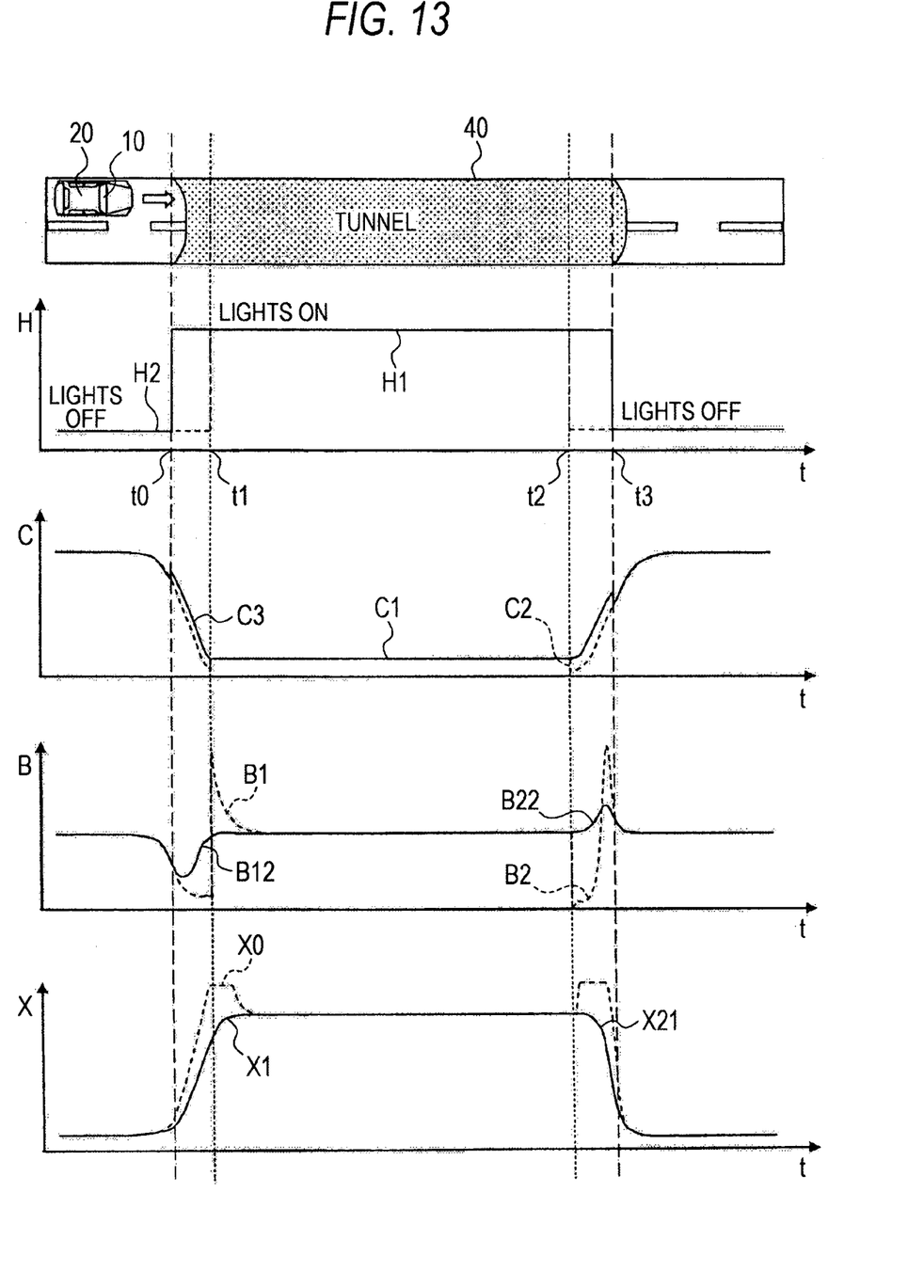
FIG. 13 is an explanatory diagram showing operation of an auto light system according to an embodiment 3 of the invention.

According to the embodiment 3 configured in this manner, because a limit on the ON threshold G resulting from expression (6) is disposed, as shown in FIG. 13 for example, the headlights are turned ON at a point in time t0 when the amount of light C in front of the vehicle is equal to or greater than the amount of light H of the headlights just before the entrance to the tunnel 40, the amount of light changes as represented by C3, and the fluctuation of the screen brightness B becomes as represented by B12. It will be understood that the fluctuation B12 of the screen brightness is smaller than the fluctuation B11 when a limit is not disposed for the ON threshold G shown in FIG. 12. In this manner, the fluctuation B12 of the screen brightness B becomes less due to the limit on the ON threshold G resulting from expression (6), and consequently, the operation amount X becomes X11, which is smaller than X1 when there is no limit on the ON threshold G shown in FIG. 12.

Further, according to the embodiment 3, because a limit on the OFF threshold F resulting from expression (5) is disposed, the headlights are turned OFF at a point in time t3 when the amount of light C in front of the vehicle is at least equal to or greater than the amount of light H of the headlights just before the entrance to the tunnel 40, and the fluctuation of the screen brightness becomes as represented by B22. It will be understood that the fluctuation B22 of the screen brightness B is smaller than the fluctuation B21 when a limit is not disposed for the ON threshold G shown in FIG. 12. In this manner, the fluctuation of the screen brightness B becomes less as represented by B22 by the limit on the ON threshold G resulting from expression (6), and consequently the operation amount becomes X21, which is smaller than X2 when there is no limit on the ON threshold G shown in FIG. 12.

It will be noted that the dotted lines representing the amount of light C in front of the vehicle, the screen brightness B, and the operation amount X in FIG. 13 represent characteristics when the operation amount X is not corrected by the correction amount J.

In this manner, according to the auto light system according to the embodiment 3 of the invention, temporary fluctuations in the screen brightness resulting from the headlights being turned ON or OFF can be controlled by disposing limits on the ON and OFF thresholds of the headlights while retaining a configuration that is the same as that of the first exemplary embodiment or the second exemplary embodiment, and affects on image processing can be reduced.

It will be noted that, although a limit resulting from expression (5) was disposed for the OFF threshold F and a limit resulting from expression (6) was disposed for the ON threshold G, the embodiment 3 may also be configured such that a limit is disposed on either one of the OFF threshold and the ON threshold.

Embodiment 4

In order to control sudden changes in the screen brightness at the entrance and exit of a tunnel, a vehicular auto light system according to an embodiment 4 of the invention is configured to obtain an estimated value of the amount of light in front of the vehicle by disposing at least one screen brightness calculation region in the screen brightness calculating means 11 above and below a front image as in FIG. 4, using the upper region as an image region 33 distant from the vehicle, using the lower region as an image region 34 of the front of the vehicle, and uses a weighted average brightness value of these regions. Other constitution thereof is similar to the embodiment 1 or the embodiment 2.

Figure 14:
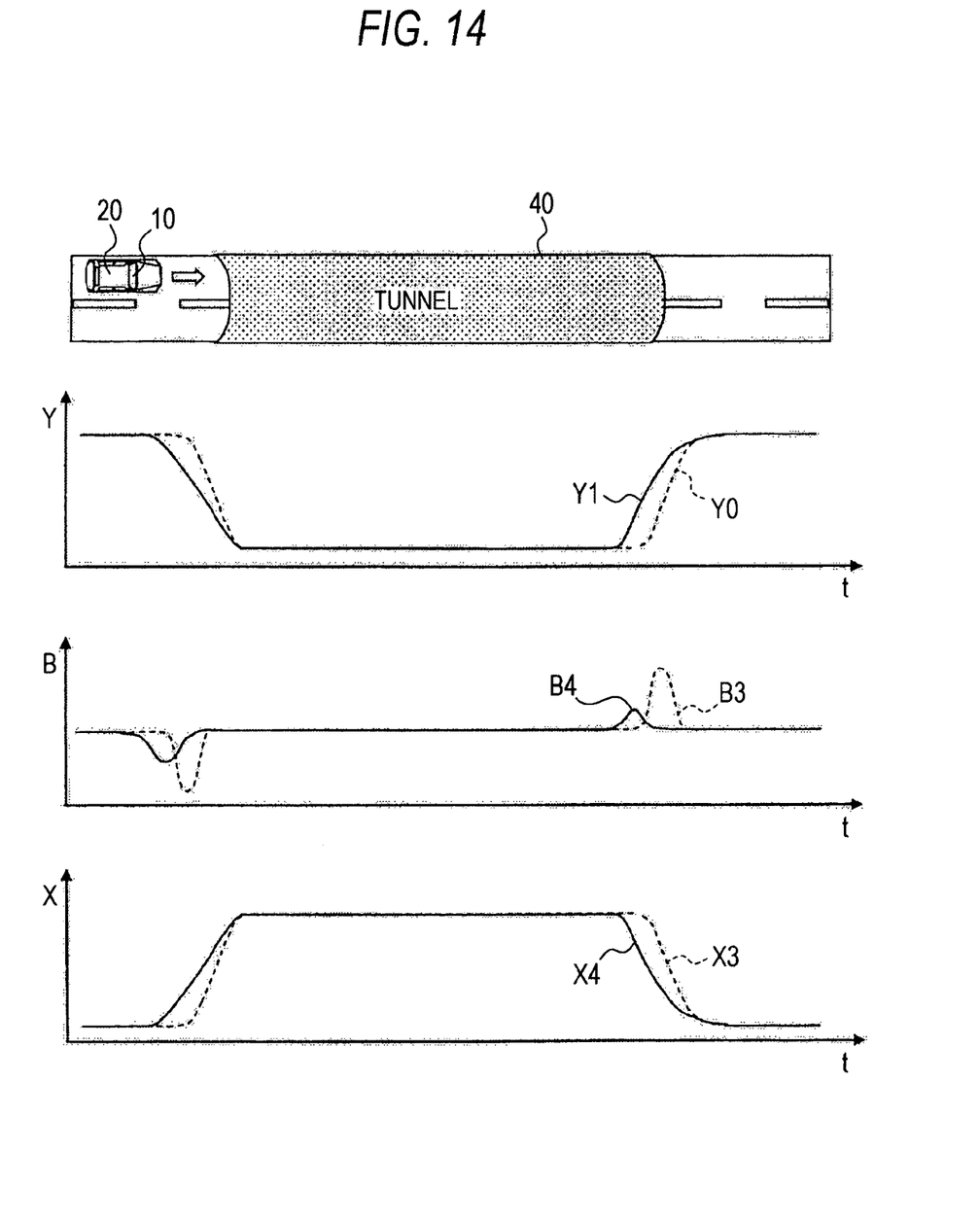
FIG. 14 is an explanatory diagram showing operation of an auto light system according to an embodiment 4 of the invention.

According to the embodiment 4, as shown in FIG. 14, the estimated value Y of the amount of light in front of the vehicle becomes a light amount estimated value Y1 including not only the amount of light in front of the vehicle (e.g., 10 m in front) but also the amount of light at the entrance and exit of the tunnel from a distance (e.g., 50 m in front), the screen brightness B becomes B4, and the operation amount X becomes X4. In contrast, in the case of the light amount estimated value Y0 of just the front (e.g., 10 m in front) of the vehicle, the screen brightness B becomes B3 and the operation amount X becomes X3. By using the light amount estimated value Y1 in this manner, there is the effect that sudden changes in the screen brightness B at the entrance and exit of a tunnel can be controlled, and the timing when the headlights are turned ON and OFF can be set ahead of time.

The embodiment 1 to 4 of the invention have been described above, but when imaging means whose dynamic range is wide (e.g., 60 dB or greater) is used as the imaging means 10 in the exemplary embodiments, the range of the amount of light that can be detected becomes wider, and saturation of the brightness value of each pixel in places where there are large differences between light and dark such as at the entrance and exit of a tunnel is prevented, so the calculation resolution of the screen brightness can be improved. That is, because the precision of estimation of the light amount estimated value that is proportional to the inverse of the operation amount also becomes better, the degree of freedom with which the timing when the headlights are turned ON and OFF is set can be expanded.

Naturally, the ON threshold G and the OFF threshold F in the embodiment 1 to 3 are set having the constraint expressed in the following expression (7).

$$G < F \quad \text{expression (7)}$$

It will be noted that the headlights may also be turned ON or OFF in response to the size of the current operation amount with respect to the operation amount during nightfall in comparison to the current operation amount when setting the operation amount during nightfall beforehand and using that operation amount as a threshold.

Various modifications and alterations of this invention will be apparent to those skilled in the art without departing from the scope and sprit of this invention, and it should be understood that this is not limited to the illustrative embodiments set forth herein.

What is claimed is:

1. A vehicular auto light system comprising:
   imaging means that is installed in a vehicle, images at least the area in front of the vehicle, and outputs image data thereof;
   screen brightness calculating means that calculates a screen brightness on the basis of the image data;
   imaging condition control means that compares the calculated screen brightness with a target value, operates the imaging means by an operation amount based on the deviation between the calculated screen brightness and the target value, and controls imaging conditions of the imaging means;
   around-vehicle light amount estimating means that estimates the amount of light around the vehicle on the basis of the operation amount; and
   headlight control means that causes headlights of the vehicle to be turned ON or OFF on the basis of the estimated amount of light.

2. The vehicular auto light system of claim 1, further comprising operation amount correcting means that corrects the operation amount resulting from the imaging condition control means on the basis of an increase or decrease in the amount of light around the vehicle resulting from the turning ON or the turning OFF of the headlights of the vehicle.

3. The vehicular auto light system of claim 1, wherein the vehicle headlight control means is disposed with at least one of an ON threshold that causes the headlights to be turned ON and an OFF threshold that causes the headlights to be turned OFF, and the ON threshold and the OFF threshold are set to values larger than the amount of light of the headlights.

4. The vehicular auto light system of claim 1, wherein the screen brightness calculating means is configured to acquire screen brightnesses of plural regions of image data obtained by the imaging means and use, as screen brightness, a weighted average brightness value of the screen brightnesses.

* * * * *